Patented Dec. 27, 1932

1,892,588

UNITED STATES PATENT OFFICE

ALBERT SCHWIEGER, OF HAMBURG, GERMANY, ASSIGNOR TO HANSEATISCHE MUHLENWERKE AKTIENGESELLSCHAFT, OF HAMBURG, GERMANY, A CORPORATION

TREATMENT OF VEGETABLE LECITHIN

No Drawing. Application filed November 13, 1931, Serial No. 574,917, and in Germany November 11, 1930.

In British Patent application No. 356,384 a process for the improvement of vegetable lecithin is described, in which hydrogen peroxide is allowed to act upon aqueous lecithin emulsion. The hydrogen peroxide solution can be added to the mixture consisting of vegetable lecithin, oil and water and allowed to act thereupon, whereupon the water is evaporated from the remaining mixture under reduced pressure in order to dry the lecithin-oil mixture. The vegetable phosphatide obtained in this manner as compared with the unbleached lecithin shows a waxlike character. For many purposes a more tenaceous softer character is necessary since in this way a better emulsifying capacity is obtained than is shown by the waxy lecithin. In mixing the lecithin with fat and oil, and mixing the fine colloidal dispersion of this mixture with water, better results are obtained with such a soft lecithin.

In order to attain this end lecithin has already been treated with blown oil. In this way, however, a wholly foreign constituent is introduced into the lecithin, the proportion of which is thus simultaneously reduced. Moreover, the addition of a substance containing hydroxy fatty acids (such as blown oil) to materials to be used for nutrient purposes is objectionable since the flavor and taste are thus disadvantageously affected.

It has now been found that the desired property of increased tenacity and softness of the vegetable lecithin can be obtained if it is subjected to treatment with dibenzoyl peroxide, whereby a simultaneous bleaching thereof, as in the use of hydrogen peroxide, results.

The so-called "soybean sludge" (German Sojaschlamm) as originally separated from the extracted oil contains a considerable amount of water and is of a thick, tough and jellylike consistency.

The "crude lecithin", which is obtained from the soya sludge by removal of the water by centrifuging or evaporating in vacuum, and which lecithin has not been further treated, (i. e. which has not been bleached), represents a pasty substance which has an appearance resembling glazier's putty and which shows a similar plasticity.

The "bleached lecithin" which has been treated with dibenzoyl peroxide shows a quite different consistency from the crude unbleached lecithin. It has a more tough consistency which resembles that of beeswax. It may be drawn out into thin threads, which is not possible with the crude lecithin, which has not been bleached and which moreover shows a crumbly and brittle consistency.

For attaining the end in view, an addition of 0.4% of dibenzoyl peroxide is suitable. In accordance with the proportion of dibenzoyl peroxide employed the tenacity can be increased as desired and the dibenzoyl peroxide can be employed together with hydrogen peroxide or in association with other peroxides.

The following example illustrates a manner of carrying the invention into effect:

Example

The treatment of vegetable lecithin with dibenzoyl peroxide alone, or with mixtures of dibenzoyl peroxide and other peroxides may, for example be carried out by mixing the peroxide or peroxides into the lecithin with warming. In place of hydrogen peroxide, sodium percarbonate, sodium peroxide, barium peroxide, sodium perborate and other persalts may be employed. These substances are hereinafter embraced in the term "inorganic peroxide compound."

I claim:

1. Method for purifying free vegetable lecithin which comprises subjecting vegetable lecithin to the action of dibenzoyl peroxide.

2. Method for purifying vegetable lecithin which comprises subjecting free vegetable lecithin to the action of dibenzoyl peroxide together with an inorganic peroxide compound.

3. Method for purifying vegetable lecithin consisting in subjecting vegetable lecithin in a free state, to the action of dibenzoyl peroxide together with hydrogen peroxide.

4. Method of treating vegetable lecithin which comprises adding a mixture of dibenzoyl peroxide and an inorganic peroxide compound, which comprises adding such substances to lecithin, intimately mixing the same and heating the mixture.

5. Light colored vegetable lecithin which is softer, of increased tenacity, and more easily emulsifiable and waxy, as compared with crude soya lecithin, and which product is substantially free from blown fatty oils.

In testimony whereof I have affixed my signature.

ALBERT SCHWIEGER.